United States Patent
Joseph

(10) Patent No.: US 6,238,202 B1
(45) Date of Patent: May 29, 2001

(54) APPARATUS FOR EJECTING THREADED INJECTION MOLDED PARTS

(75) Inventor: Ealias C Joseph, Markham (CA)

(73) Assignee: Unique Mould Makers Limited, Toronto (CA)

( * ) Notice: Subject to any disclaimer, the term of this patent is extended or adjusted under 35 U.S.C. 154(b) by 0 days.

(21) Appl. No.: 09/258,299

(22) Filed: Feb. 26, 1999

(51) Int. Cl.$^7$ .................................................. B29C 45/44
(52) U.S. Cl. ........................................... 425/556; 425/809
(58) Field of Search ................................... 425/139, 556, 425/577, 438, 444, 809; 249/59

(56) References Cited

U.S. PATENT DOCUMENTS

| | | | |
|---|---|---|---|
| 3,712,786 | 1/1973 | Aoki | 425/438 |
| 3,737,268 | 6/1973 | Ryder | 425/192 |
| 4,155,698 | 5/1979 | Aichinger | 425/556 |
| 4,274,617 | 6/1981 | Schriever | 249/63 |
| 4,496,302 * | 1/1985 | Brown | 425/547 |
| 4,881,892 | 11/1989 | Webster et al. | 425/577 |
| 5,061,168 | 10/1991 | Fox | 425/190 |
| 5,135,700 | 8/1992 | Williams et al. | 264/318 |
| 5,230,856 * | 7/1993 | Schellenbach | 264/328.1 |
| 5,368,469 | 11/1994 | Ekkert | 425/556 |
| 5,383,780 | 1/1995 | McCready et al. | 425/552 |
| 5,421,717 | 6/1995 | Hynds | 425/556 |
| 5,518,679 | 5/1996 | Junk | 264/318 |
| 5,558,887 | 9/1996 | Skufca et al. | 425/418 |
| 5,565,223 | 10/1996 | McCready et al. | 425/556 |
| 5,609,894 | 3/1997 | Rathbun | 425/556 |
| 5,776,521 | 7/1998 | Wright et al. | 425/556 |
| 5,798,074 | 8/1998 | McCready et al. | 264/318 |

* cited by examiner

*Primary Examiner*—Tim Heitbrink
*Assistant Examiner*—Emmanuel Luk
(74) *Attorney, Agent, or Firm*—Ridout & Maybee LLP

(57) ABSTRACT

An apparatus and method for ejecting threaded injection molded articles from a mold core by simultaneous application of rotational and translational force. The apparatus has a stripper ring which is rotatable about and movable along its axis. A driver rotates a stripper ring rotator in response to input from a machine ejector rod. Input from the machine ejector rod is transferred to the driver by a helically splined spindle which is axially movable relative to the driver and which engages a corresponding helically splined bore in the stripper ring rotator. Rotation of the stripper ring rotator is transferred to the stripper ring by meshing pinions. The stripper ring rotator also has a gear which meshes with corresponding teeth in a transversely extending rack to cause movement of the rack. Cams are secured to the rack and act against cam followers connected to the stripper ring to translate transverse movement of the rack into axial movement of the stripper ring.

13 Claims, 6 Drawing Sheets

APPARATUS FOR EJECTING THREADED INJECTION MOLDED PARTS

FIELD OF THE INVENTION

This invention relates to plastic injection molding and more particularly, to stripping apparatus for plastic injection molds and even more particularly, to an unscrewing apparatus for ejecting threaded plastic closures.

BACKGROUND OF THE INVENTION

The injection molding of plastics generally involves introducing molten plastic under pressure into a space defined between a core part and a cavity part of an injection mold. The molten plastic is allowed to cool and thereby solidify to form a "part" in the space, after which the core and cavity parts are separated. The part generally shrinks a bit upon cooling and remains on the core part of the mold from where it must be "stripped".

Simple parts having no internal protrusions may be stripped in a variety of ways, including air pressure, stripper plates or rings and ejector rods. A stripper plate is basically a plate which lies against the core part of the mold during injection and through which individual cores extend. The stripper plate, which is moved away from the core part during stripping, presses against an innermost edge of the molded part to urge the part off of the core part of the mold.

Threaded parts are more difficult to strip. Parts with shallow threads may sometimes be forced off of a core using a stripper plate. Deeper threads however would be damaged by any effort to force them off the core with a stripper plate.

The optimal mechanism for removing a threaded part from a core is a simultaneous combination of pressure away from the core and rotation or "unthreading". Simple rotation on its own may damage the newly formed threads as parts are generally stripped while still warm to maximize output and therefore, the threads are still somewhat soft during stripping.

Mechanisms for removing threaded closures from injection molds are well known in the industry. One common method includes a rotating core to unscrew the molded closure from the core and eject the part. A major problem with this mechanism is one of water leakage due to the use of rotary seals necessary because the cores are typically water cooled. To overcome this problem, injection molds having stationary cores have been developed, for example, U.S. Pat. No. 5,383,780 (McCready et al.)

U.S. Pat. No. 5,383,780 (McCready et al.) and related U.S. Pat. Nos. 5,565,223 and 5,798,074 disclose apparatus for removing molded threaded parts using a movable, rotatable stripper ring. McCready utilizes what is referred to as a pinion to rotate a stripper ring coaxial with a mold core. The pinion is mounted for movement with the stripper ring. The pinion receives rotational input from a rack through a gear. The rack in turn receives input from a hydraulic cylinder mounted transversely to the molding machine axis.

In McCready, translational movement is provided by a pneumatic piston extending longitudinally relative to the machine axis and acting on the stripper ring support structure. Translational movement is controlled by a cam secured to and moveable with the rack. The cam does not move the stripper ring but instead prevents the degree of movement that would otherwise occur as a result of the pneumatic piston being actuated.

While McCready does provide an apparatus for synchronously, rotating and translating a stripper ring, it is mechanically quite complex requiring both hydraulic and pneumatic cylinders which must be coordinated with the molding machine cycle. This requires special machine logic which can only be incorporated in certain models of molding machines. Furthermore, hydraulic cylinders are prone to leakage which can contaminate the parts being formed and the hydraulic cylinder and its associated structure are quite bulky, requiring a considerable amount of space.

Pneumatic cylinders are also prone to leak which results in compressed air leakage. Compressed air leakage can cause contamination due to condensation. Contamination of any kind would prevent the use of a mold in a "clean room" environment. A clean room environment is often required in closure manufacturing.

Finally, the McCready arrangement is relatively expensive due to the complexity of the structures involved and the additional machine logics.

An object of the present invention is to provide an apparatus for rotating and translating a stripper ring which apparatus is driven by a machine ejector of an injection molding machine rather than a separate remote drive structure.

A further object of the present invention is to provide an apparatus for ejecting threaded injection molded parts which is suitable for a clean room environment without fear of contamination.

A still further object of the present invention is to provide an apparatus for ejecting threaded injection molded parts which may be used with a basic injection molding machine without adding special machine logic.

Yet another object of the present invention is to provide an apparatus useable with an unlimited number of cavitations, preferably in multiples of four, including a 72 cavity mold.

SUMMARY OF THE INVENTION

An unscrewing apparatus for stripping threaded injection molded articles from a mold core having a core axis generally parallel to a machine axis of an injection molding machine. The unscrewing apparatus has a rotatable stripper ring coaxial with the mold core, a stripper ring rotator for rotating the stripper ring about the core axis, a translator for moving the stripper ring relative to the core in an axial direction generally parallel to the core axis and a driver for rotating the stripper ring rotator.

The stripper ring rotator is rotatable about a rotator axis generally parallel to the machine axis and has a radially extending stripper ring drive pinion which meshes with a stripper ring driven pinion extending radially about the stripper ring. The stripper ring drive pinion causes the stripper ring to rotate about the core axis in response to rotation of the stripper ring rotator.

The driver for rotating the stripper ring has a helically splined spindle connected at one end to and axially moveable by a machine ejector rod. The spindle engages a corresponding, axially extending, helical spline in the stripper ring rotator to cause the stripper ring rotator to rotate in response to relative axial movement between the stripper ring rotator and the spindle imparted by movement of the machine ejector rod.

The stripper ring rotator has gear teeth extending radially thereabout which mesh with corresponding teeth of a transversely extending rack which forms part of the translator. The gear teeth cause transverse movement of the rack in response to rotation of the stripper ring.

The rack has at least one cam secured to it. The cam acts on a cam follower connected to the stripper ring to move the stripper ring in the axial direction at a controlled rate to synchronize the translational and rotational movement of the stripper ring to correspond to the rate at which the threaded article unthreads.

One embodiment of this invention has a plurality of stripper ring rotators each of which is mounted between and drives a plurality of stripper rings.

Another embodiment of this invention has the ejector rod connected to each spindle by an ejector plate.

DESCRIPTION OF DRAWINGS

Preferred embodiments of the present invention are described below with reference to the accompanying drawings in which.

DESCRIPTION OF PREFERRED EMBODIMENTS

Figure 1:
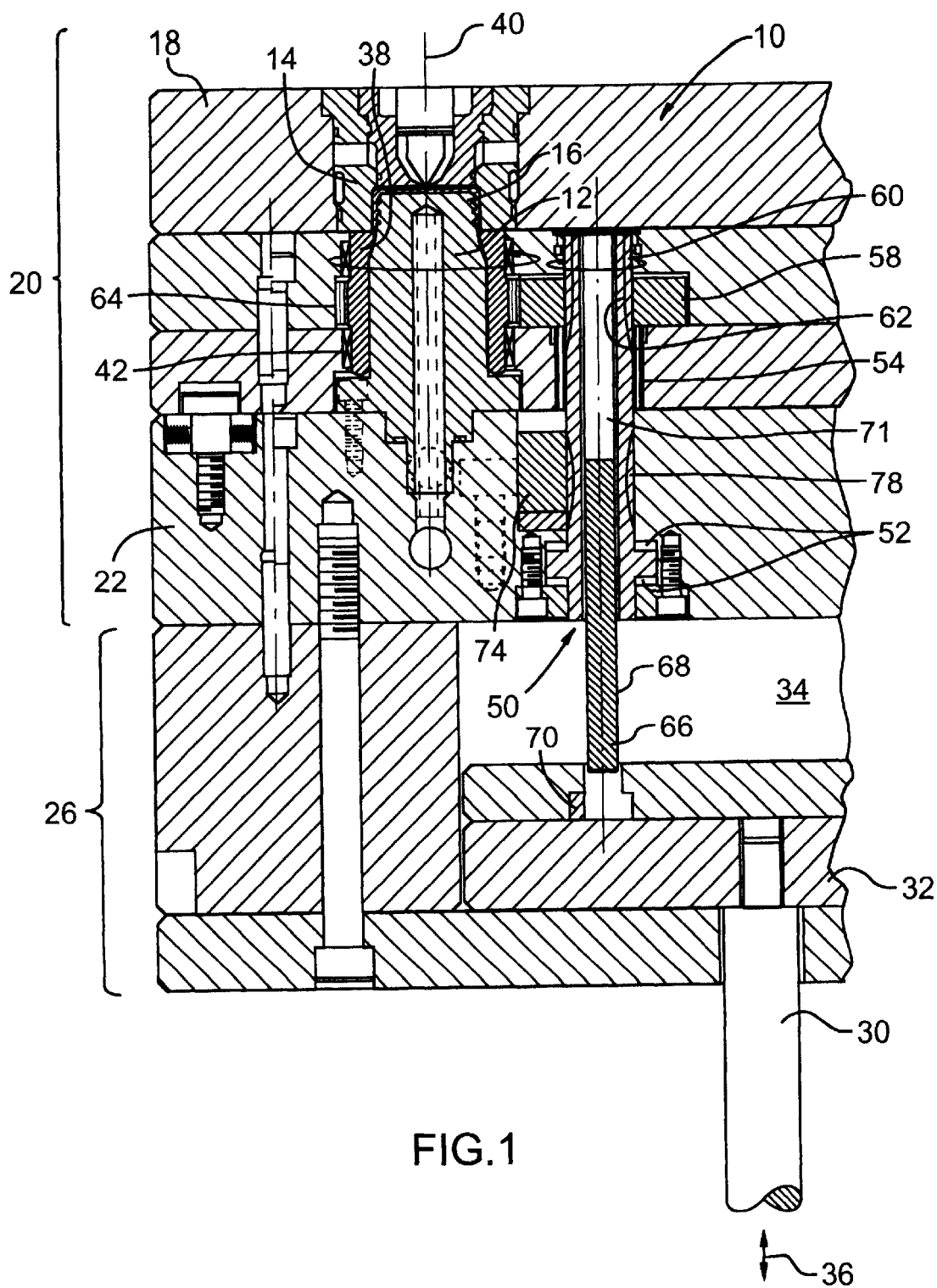
FIG. 1 is a sectional view through an unscrewing apparatus according to the present invention in a "mold closed" position.
Figure 2:
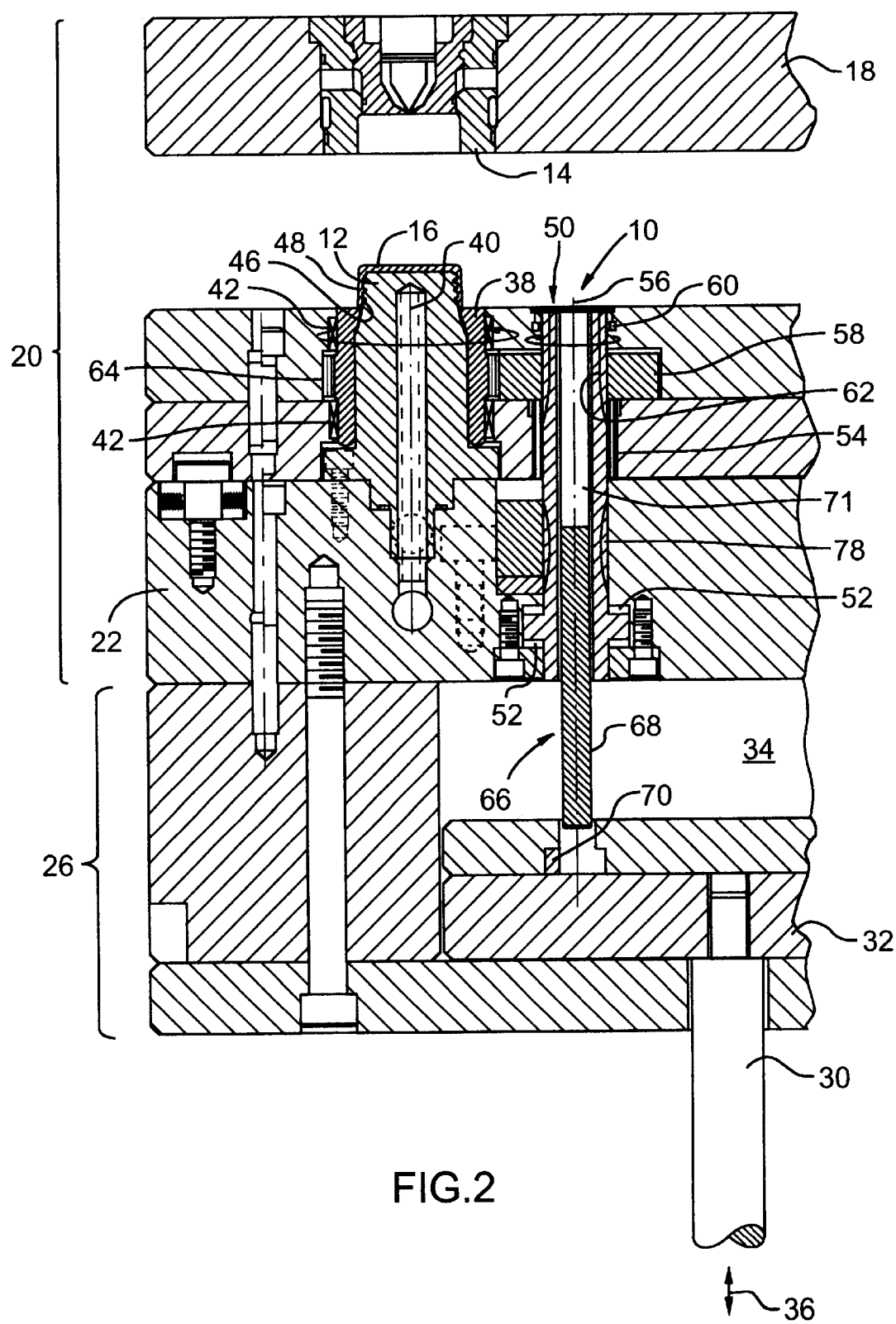
FIG. 2 is a sectional view through an unscrewing apparatus according to the present invention in a "mold open" position showing a stripper ring in a retracted position.
Figure 3:
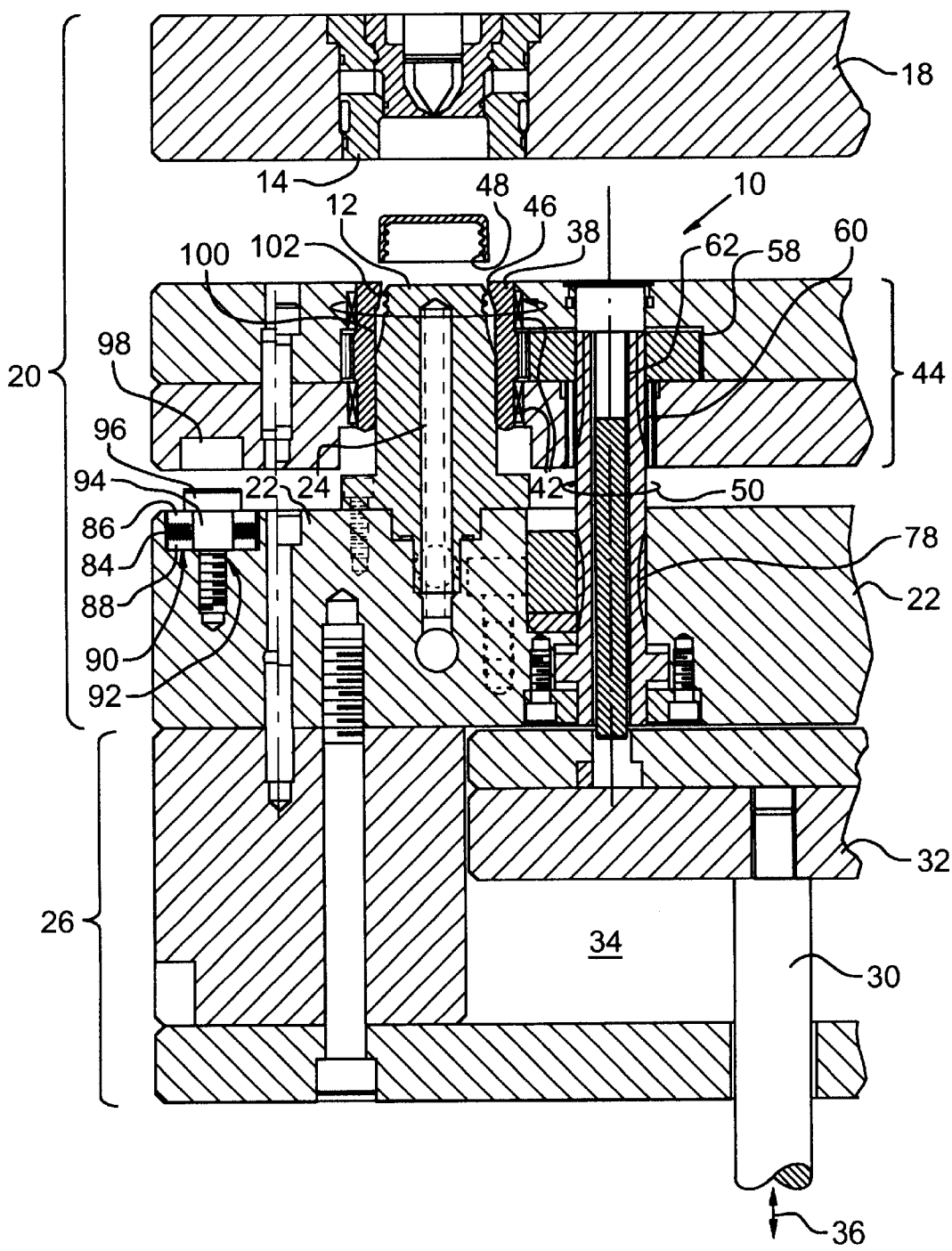
FIG. 3 is a sectional view through an unscrewing apparatus according to the present invention in a "mold open" position showing the stripper ring in an extended position.

An unscrewing apparatus according to the present invention is generally indicated by reference 10 in FIGS. 1, 2 and 3. The unscrewing apparatus 10 is shown in association with a mold core 12, a mold cavity 14 and a molded part 16 which has been formed between the core 12 and cavity 14.

The mold cavity 14 is mounted in a cavity part 18 of an injection mold generally indicated by reference 20 in FIG. 1. The mold core 12 is mounted to a core part 22 of the injection mold 20. The mold core has an internal coolant passage 24 in FIG. 3 for the circulation of water or other coolant medium.

The core part 22 of the mold 20 is mounted to a mold base 26 which is mounted to a moving platen (not shown) of an injection molding machine, the entirety of which is not illustrated. The molding machine includes a machine ejector rod 30 secured at one end to an ejector plate 32 mounted within an ejector box 34 in the mold base 26. The machine ejector rod 30 is axially moveable in the direction of arrows 36 which is parallel to what is referred to herein as the "machine axis". The machine axis lies along the direction of opening and closing of the injection molding machine.

A rotatable stripper ring 38 circumferentially surrounds the mold core 12 and is coaxial with the mold core 12, which has a core axis 40. The stripper ring is mounted for rotation by bearings 42 in a stripper plate 44. The stripper ring 38 is axially moveable in a direction generally parallel to the core axis between a "mold closed" or "molding" position as illustrated in FIG. 1 and an "ejecting" position illustrated in FIG. 3. In the mold closed position, the stripper plate 44 is against the core part 22 of the mold 20 with an inner edge 46 of the stripper ring beneath a lowermost edge 48 of the part 16. The inner edge 46 would typically be serrated so as to positively engage the part 16.

The stripper ring 38 acts to remove the part 16 from the mold core 12 by simultaneously pressing the part 16 away from the mold core and rotating the part 16 to unthread it. The pressing or "translational" movement of the stripper ring 38 against the part 16 must be synchronized with the rotational movement to avoid, as much as possible, any undue stress on the threads. How this may be accomplished according to the present invention is discussed in more detail below.

Rotational input for the stripper ring 38 is provided by a stripper ring rotator generally indicated by reference 50. The stripper ring rotator 50 is mounted by thrust washer/needle bearing assemblies 52 and a bushing 54 for rotation about a rotator axis 56 generally parallel to the machine axis. The stripper ring rotator 50 has a stripper ring drive pinion 58 slidably mounted thereon by straight splines 60 on the stripper ring rotator which engage corresponding splines 62 in the center of the stripper ring drive pinion. The splines enable the stripper ring drive pinion 58 to move axially relative to the balance of the stripper ring rotator 50 while remaining rotationally coupled thereto.

The stripper ring drive pinion 58 meshes with a stripper ring driven pinion 64 which extends radially about the stripper ring 38. The stripper ring driven pinion 64 therefore receives rotational input from the stripper ring rotator 50.

The stripper ring rotator 50 is rotated by a driver 66 which is a spindle having helical splines 68 and which is connected at one end to the machine ejector rod 30 through the ejector plate 32. The driver 66 is rotatably and axially fixed relative to the ejector plate 32 so as to move axially in response to movement of the machine ejector rod 30, but so as not to rotate about its own axis. A key 70 may be provided to prevent rotation or other securing means may be used.

The stripper ring rotator 50 has a corresponding axially extending helically splined bore 71 which engages the spindle 66. Axial movement of the spindle relative to the stripper ring rotator 50 is converted by the helical splines 68 and helically splined bore 71 into rotational movement of the stripper ring rotator 50.

Figure 5:
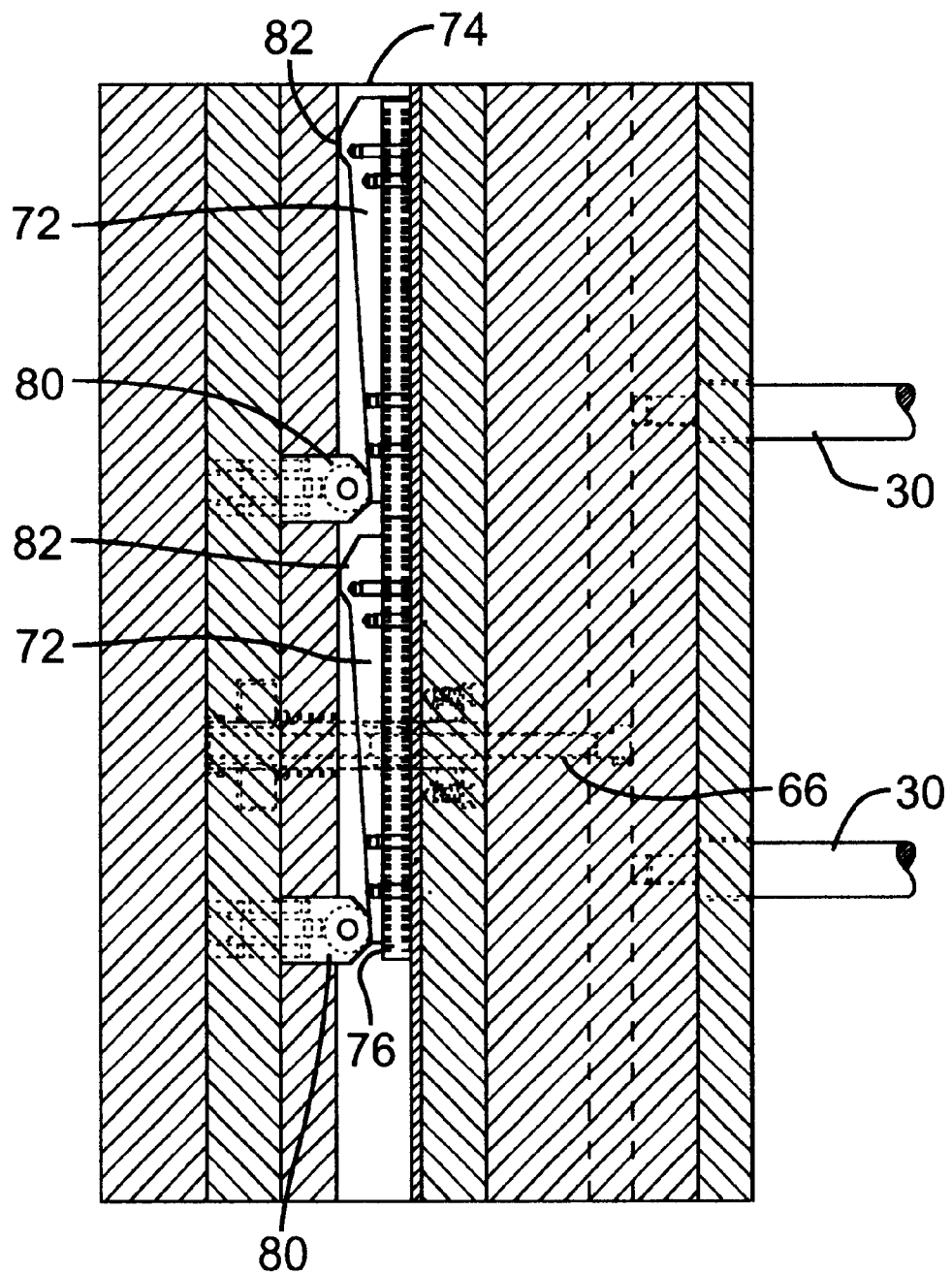
FIG. 5 is a section on line 5—5 of FIG. 4 corresponding to the retracted position of the stripper ring; and, FIG. 6 is a section on line 5—5 of FIG. 4 corresponding to the extended position of the stripper ring.
Figure 6:
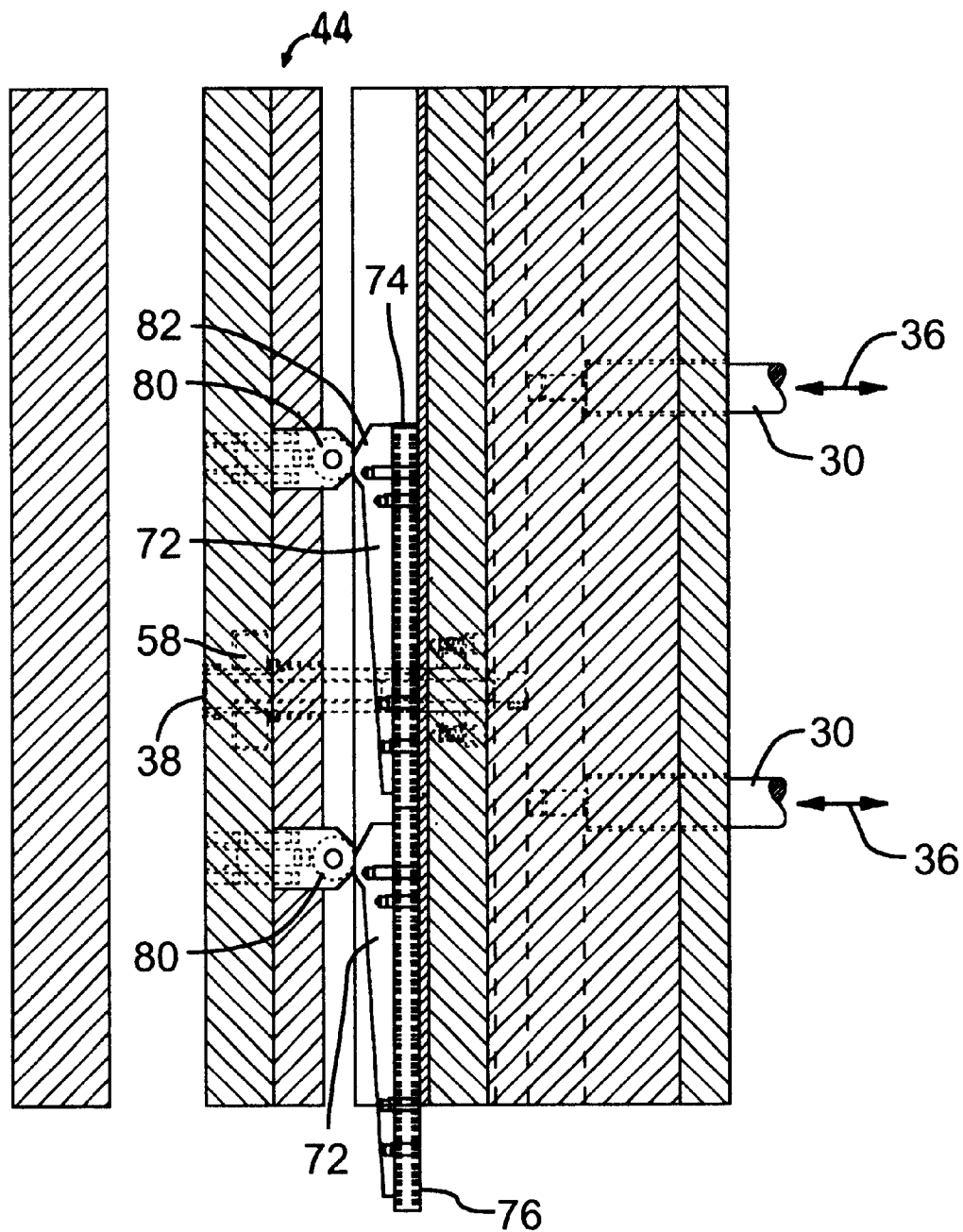

Translational movement of the stripper ring 38 is provided by a cam and cam follower arrangement which is best illustrated in FIGS. 5 and 6. A pair of cams 72 are secured to respective racks 74 which extend transversely relative to the machine axis. Each rack 74 has teeth 76 extending along one side which mesh with gear teeth 78 extending radially about each stripper ring rotator 50. As the stripper ring rotator 50 is rotated by the spindle 66, the meshing of the gear teeth 78 (in FIGS. 1 through 3) and the teeth 76 of the rack causes the rack 74 and associated cams 72 to move transversely.

The cams 72 act against cam followers 80 which are secured to the stripper plate 44 and through the stripper plate 44 to the stripper ring 38. Accordingly, rotation of the stripper ring rotator 50 causes simultaneous rotation of the stripper ring 38 through action of the drive pinion 58 and driven pinion 62 and translation of the stripper ring 38 through the action of racks 74, cams 72 and cam followers 80. The profile of the cams 72 is selected to ensure that the stripper ring 38 is moved axially at a rate corresponding to an "unthreading rate" of the part 16. The "unthreading rate" is the rate at which the threads cause axial movement in response to rotational movement. The cam profile should therefore have a slope corresponding to the pitch of the thread of the threaded article.

The cams 72 may have a steeper slope at an end 82 to accelerate the axial movement of the stripper ring 38 once unthreading is complete. Although it may be possible to use only one cam 72 with a suitably supported stripper plate, preferably a plurality of cams 72 and racks 74 are utilized to balance forces on the stripper plate and reduce the possibility of jamming.

Figure 4:
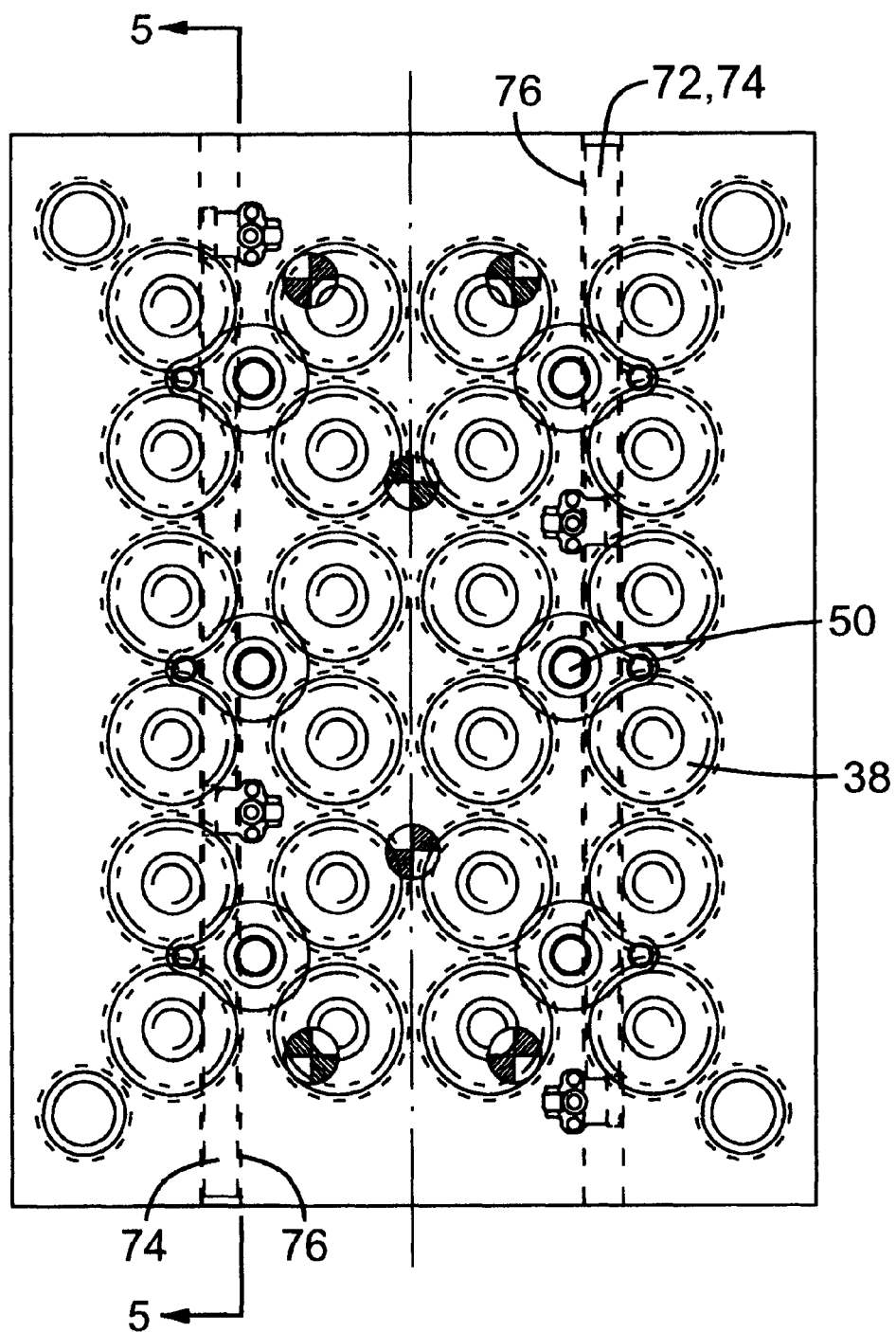
FIG. 4 is a front elevation of a stripper plate incorporating a plurality of unscrewing apparatus according to the present invention.

As illustrated in FIG. 4, a single stripper ring rotator 50 may be utilized to drive a number of stripper rings 38 (for example, four are illustrated). Such an arrangement has the added advantage of equalizing forces on the stripper ring driver 50 to minimize unwanted lateral forces.

In order to minimize wear between the core 12 and the stripper ring 38, it is preferable to marginally lift the stripper ring 38 away from the core 12 prior to the commencement of stripper ring rotation. The amount of lift typically wouldn't exceed 0.005 in. (0.127 mm) and would typically range from 0.003 in to 0.005 in. (0.0762 to 0.127 mm). The lift should be sufficient to just separate a tapered surface 100 on the core 12 from a corresponding overlying tapered surface 102 on the stripper ring 38 (see FIG. 3).

Initial separation to marginally lift the stripper ring 38 away from the core 32 may be achieved through the use of disc springs 84 in FIG. 3 or other suitable biasing means mounted between an upper washer 86 and a lower washer 88 within a suitable recess 90 in the core part 22 of the mold 20 and held in place by a bolt 92. The bolt 92 may be provided with a shank 94 dimensioned to allow the upper washer 86 to stand proud of an upper surface of the core part 22 by a suitable amount, typically 0.003 to 0.005 in. (0.0762 to 0.127 mm). The bolt has a head 96 which is accommodated within a recess 98 in the stripper plate 44.

The disc springs 84 allow the upper washer 86 to be pressed into the recess 90 by mold closing forces when the mold 20 is closed. Upon mold opening, the disc springs lift the upper washer 86 out of the recess 90 which presses against the stripper plate 44 causing it and consequently the stripper ring 38 to marginally lift away from the core 12.

An advantage to the present invention is that it avoids having superstructures mounted on top of the mold to drive the stripper ring drive mechanism which in turn avoids having mold parts sticking out of the machine and allows for easy installation.

A further advantage of the present invention is that it requires no additional hook up during installation as there are no hydraulic or pneumatic cylinders to be connected.

Yet a further advantage of the present invention is that it permits easy removal of all molding inserts from the mold while the mold remains in the machine. Additionally, the structure of the present invention provides the capability of interchanging complete molding insert stacks in the machine without taking the mold out of the machine.

A still further advantage of the present invention is that it provides a compact mold design which allows for a greater number of mold cavitations for a given machine than possible with earlier designs.

The above description is intended in an illustrative rather than a restrictive sense. Variations may be apparent to persons skilled in such apparatus without departing from the spirit and scope of the present invention as described in the accompanying claims.

I claim:

1. An apparatus for ejecting a threaded injection molded article from a mold core having a core axis parallel to a machine axis of an injection molding machine, said apparatus comprising:

a rotatable stripper ring coaxial with said mold core;

a stripper ring rotator for rotating said stripper ring about said core axis;

a translator for moving said stripper ring relative to said mold core in an axial direction parallel to said core axis;

a driver for rotating said stripper ring rotator;

said stripper ring rotator being mounted for rotation about a rotator axis parallel to said machine axis and having a radially extending stripper ring drive pinion which meshes with a stripper ring driven pinion extending radially about said stripper ring for causing rotation of said stripper ring about said core axis in response to rotation of said stripper ring rotator;

said driver for rotating said stripper ring including a helically splined spindle connected at one end to and axially moveable by a machine ejector rod, said spindle engaging a corresponding axially extending helically splined bore in said stripper ring rotator to cause said stripper ring rotator to rotate in response to relative axial movement between said stripper ring rotator and said spindle imparted by said machine ejector rod;

said stripper ring rotator having gear teeth extending radially thereabout and meshing with corresponding teeth on a transversely extending rack which forms part of said translator, said gear teeth causing transverse movement of said rack in response to rotation of said stripper ring; and said rack having at least one cam secured thereto and moveable therewith, said cam acting on a respective cam follower connected to said stripper ring to move said stripper ring in said axial direction at a controlled rate to synchronize translational and rotational movement of said stripper ring to correspond to the rate at which said threaded injection molded article unthreads.

2. An apparatus as claimed in claim 1 having a plurality of said stripper ring rotators each of which is mounted between and rotates a plurality of said stripper rings.

3. An apparatus as claimed in claim 2 wherein said ejector rod is connected to each said spindle by an ejector plate.

4. An apparatus as claimed in claim 3 wherein each said stripper ring drive pinion is axially slidable along a respective stripper ring rotator.

5. An apparatus as claimed in claim 4 wherein said stripper rings are mounted in a stripper plate and each said respective cam follower is secured to said stripper plate.

6. An apparatus as claimed in claim 5 wherein:

each said translator has at least two cams secured to each said rack:

biasing means are mounted to act between said stripper plate and a core part of said mold to marginally lift said stripper ring off of said core part in response to mold opening.

7. An apparatus as claimed in claim 6 wherein said biasing means lifts said stripper ring off of said mold core in an amount of from 0.003 to 0.005 inches (0.0762 to 0.127 mm).

8. An apparatus as claimed in claim 7 wherein each said biasing means includes:

disc springs mounted between upper and lower washers, secured together with a bolt;

said upper washer presses against a stripper plate of said mold when said mold is in a closed position; and, a recess is provided within said stripper plate of said mold to accommodate a head of said bolt.

9. An apparatus for ejecting a threaded injection molded article from a mold core having a core axis parallel to a machine axis of an injection molding machine, said apparatus comprising:

at least one rotatable stripper ring coaxial with said mold core;

a stripper ring rotator rotationally coupled to said stripper ring for rotating said stripper ring about said core axis;

a translator for moving said stripper ring relative to said mold core in an axial direction parallel to said core axis;

a driver for rotating said stripper ring rotator;

said translator includes at least one cam acting between a core part of said mold and said stripper ring;

said translator is coupled to and driven by said rotator; and said driver being mounted between said stripper ring rotator and a machine ejector rod of said molding machine to convert axial movement of said machine ejector rod into rotational movement of said stripper ring rotator.

10. An apparatus as claimed in claim 9 wherein:

a plurality of said stripper rings are mounted in a stripper plate, and each of said stripper rings are rotationally coupled to said stripper ring rotator;

biasing means are provided between a core part of said mold and a stripper plate to marginally lift each stripper ring away from said core part upon opening of said mold;

said stripper ring rotator being rotationally coupled to said stripper rings by a stripper ring drive pinion engaging a stripper ring driven pinion extending about each said stripper ring;

said translator includes a rack which is coupled to said stripper ring rotator by meshing with a gear extending about said stripper ring rotator;

said translator having a plurality of said cams mounted to said rack; and said driver includes a helically splined shaft connected to said machine ejector rod for movement parallel to said machine ejector rod, said helically splined shaft meshing with a helically splined bore extending generally axially into said stripper ring rotator.

11. An apparatus as claimed in claim 10 wherein:

said stripper ring drive pinion is axially slidable along said stripper ring rotator and moves axially with said stripper plate.

12. An apparatus as claimed in claim 11 wherein:

said helically splined spindle is mounted to an ejector plate within a mold base and said ejector plate is connected to said ejector rod.

13. An apparatus as claimed in claim 12 wherein:

each said biasing means includes a pair of washers separated by disc springs and held in place with a bolt having a head which is received within a recess extending into said stripper plate of said mold when said mold is closed;

said pair or washers includes an upper and a lower washer, said upper washer acting against said stripper plate; and said biasing means lifts said stripper ring from about 0.003 in. (0.0762 mm) to about 0.005 in. (0.127 mm) away from said mold core.

* * * * *